Oct. 8, 1963    W. KLAMP    3,106,630
SEALING APPARATUS
Filed May 8, 1961
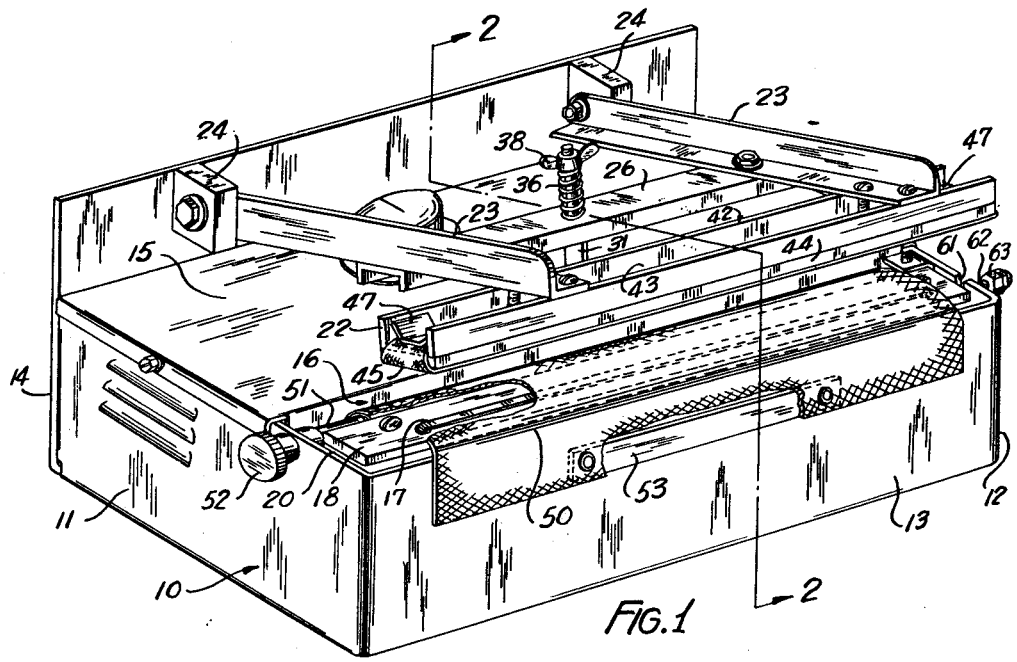
FIG. 1
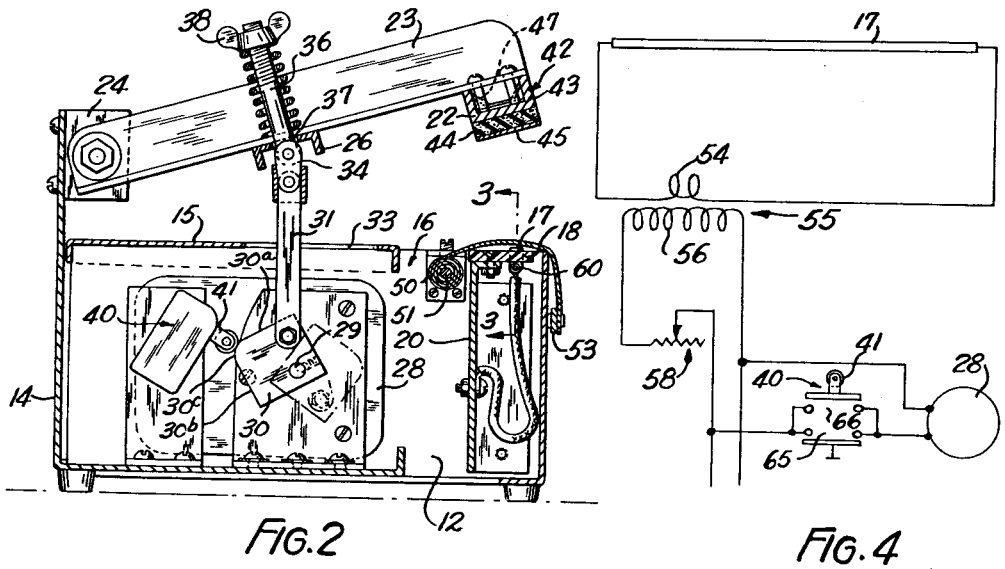
FIG. 2    FIG. 4
FIG. 3
INVENTOR.
WILLIAM KLAMP
BY
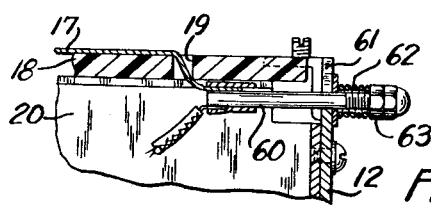
ATTORNEYS

United States Patent Office 3,106,630
Patented Oct. 8, 1963

3,106,630
SEALING APPARATUS
William Klamp, Rocky River, Ohio, assignor to Cleveland-Detroit Corporation, Cleveland, Ohio, a corporation of Delaware
Filed May 8, 1961, Ser. No. 108,655
3 Claims. (Cl. 219—19)

The present invention relates to apparatus for forming a seal between flexible sheets of heat-sealable organic materials, such as cellophane and polyethylene sheets.

It has become common to form seams which connect flexible sheets of heat-sealable material, for example, cellophane and thermoplastic materials, such as polyethylene, by heating the material to form a weld between the sheets to be connected. Different types of apparatuses have been designed for welding heat-sealable material, particularly materials which are used in the wrapping and packaging industry.

In one known type of apparatus, the sheets to be joined are pressed between two pressure members, one of which is a metal bar or plate, or the like, which is heated by an electrical heating element separate from the bar or plate, the apparatus effecting a welding of the sheets along a seam where the heated bar engages the sheets. One of the main problems with this type of apparatus is that considerable time is required to bring the bar or plate up to temperature and to make changes in the temperature when changes are required. Therefore, considerable time is lost in allowing the plate or bar to heat or cool to the proper temperature and often several adjustments must be made in the heating element for the plate or bar before the desired temperature is obtained.

The temperature at which the heated pressure element must operate to effect a good seal or weld between sheets of heat-sealable organic materials will vary depending upon the type of materials being joined and the thickness of the materials. Consequently, it often becomes desirable to change the temperature of the heated pressure member of the apparatus. In the described type of apparatus, this is a slow and cumbersome procedure.

Another type of heating and sealing apparatus is the type commonly known as an impulse type of sealer. In the impulse type of sealer, a wirelike heating element is disposed in close proximity to sheets being pressed together by a pair of pressure members and the element is momentarily energized to fuse the material and, while the pressure is applied, the seam or weld is cooled in order to make an acceptable weld. Commonly, the heating element in the impulse type sealer heats the plastic material by convection or radiation. Since the heating element is only momentarily energized and the weld cooled, changes in sealing temperature can be effected by varying the sealing time or magnitude of current. While the impulse type sealer is capable of producing satisfactory welds, the heating of the plastic material cannot be controlled as finely as is desirable since the wirelike heating element is energized with a larger current each time a weld is to be formed than is necessary to produce the required temperature to effect a quick heating of the element and, consequently, the timing becomes somewhat critical and a tendency to overheat results. Furthermore, the heating element of impulse sealers has not constituted the pressure element so that the heating element must heat other parts or heat the sheets by convection and radiation, making temperature control more difficult. In addition, the cycle for each weld or seal must be such as to include a cooling period and, therefore, the number of seals or welds which can be made during any given period is reduced.

An important object of the present invention is to provide a new and improved apparatus for effecting a weld or seal between two sheets of flexible heat-sealable organic materials, for example, polyethylene or cellophane, with the apparatus having a heated pressure element for effecting the weld and whose temperature can be quickly and readily changed.

Another object of the present invention is to provide a new and improved method and apparatus for welding heat-sealable sheets together wherein a heating element, continuously energized with an electric heating current, is used as a pressure element for pressing the sheets to be joined together.

Still another object is to provide a heating apparatus as in the next preceding object which is capable of forming an airtight seal between the sheets which are welded.

Still another object of the present invention is to provide a new and improved apparatus for welding thermoplastic sheets wherein an electrically energized wirelike element is used as a pressure member to press the sheets together and wherein the temperature of the element can be rapidly changed and the structure of the apparatus is such that the element can be maintained continuously energized and the element kept in engagement with a backing member for that length of the element which functions as a pressure member.

In accordance with the present invention, a wirelike heating element supported by a member of heat-insulating material is used as one of the pressure elements for pressing two sheets of heat-sealable material together to join the sheets, the structure of the apparatus being such that the wirelike heating element is continuosuly energized and is heat-insulated from all other parts of the apparatus which might function as a heat sink and thereby prevent the temperature of the wirelike heating element from being quickly changed by merely varying the current therein. In the preferred and illustrated embodiment, a heat-insulating support member forms a backing for the wirelike heating element substantially throughout that part of the length of the heating element which functions as a pressure member and the element is tensioned to hold it against the support member to assure that a uniform pressure is being applied to the sheets being sealed for the length of the seam, and the wirelike heating element constitutes a significant part of the resistance in the circuit for energizing the element so that changes in the resistance of the wire due to temperature changes will have a significant effect on the current flowing in the circuit so as to maintain the temperature of the heating element substantially constant for a given applied potential.

Referring to the drawings:

FIG. 1 is a perspective view of an apparatus embodying the present invention;

FIG. 2 is a cross-sectional view taken approximately upon line 2—2 of FIG. 1;

FIG. 3 is a fragmentary sectional view taken approximately along line 3—3 of FIG. 2; and FIG. 4 is a simplified circuit diagram.

While the present invention is susceptible of various constructions and modifications and of use where it is desired to join heat-sealable organic materials by welding the materials along a seam, it is particularly useful when embodied in an apparatus for forming an airtight seam between two sheets of heat-sealable material which are to be used for packaging.

In the packaging industry, bags open at one end are commonly provided as packages for various produce and articles. The articles are put into the bags and the open end then sealed and, in many cases, it is desirable that the seal be an airtight seal. The apparatus shown in FIG. 1 is particularly suitable for forming an airtight seal between two flexible sheets of heat-sealable material and, as shown in the drawings, the preferred and illustrated embodiment of the present invention comprises a housing 10 having side walls 11, 12, a front wall 13 and a rear wall 14 which extend upwardly above the top of the housing 10. The housing 10 is closed on the top by a cover plate 15 which extends forwardly from the rear plate 14 and terminates short of the front wall 13 to provide a space 16 in which a wirelike heating element 17 is supported. The wirelike heating element 17 is supported at approximately the level of the outer face of the plate 15 by a flat support member 18 which is fixed to the top of an intermediate wall 20 extending parallel to the front wall 13 between the side walls 11, 12. The support member 18 is formed of heat-insulating material and is bolted to a horizontal flange extending outwardly from the top of the wall 20. The support member 18 has a flat upper side which supports the heating element 17 and backs the heating element 17 for that part of the length thereof which is outwardly of the support member 18. The opposite ends of the heating element 17 pass through openings 19 in the support member 18.

As is apparent from the drawings, the heating element 17 projects outwardly from the outer side of the support member 18 toward a movable jaw 22 disposed above the support member 18. The movable jaw 22 is fixed to the outer ends of a pair of arms 23 pivoted at their rearward ends to blocks 24 secured to the portion of the rear wall 14 extending above the cover plate 15. The arms 23 are movable about their pivots to move the jaw 22 downwardly into engagement with the wirelike heating element 17. A cross bar 26, which is channel-shaped in the illustrated embodiment, is bolted to the arms 23 and a motor 28 is connected to the cross bar to raise and lower the arms 23 and to move the jaw 22 between open and closed positions. The motor 28 has a motor shaft 29 to which a crank plate 30 is fixed for rotation therewith. A link 31 is connected to the crank plate 30 at a point displaced from the axis of the motor shaft 29 and the link 31 extends upwardly through an opening 33 in the cover plate 15 to a position adjacent the underside of the cross bar 26. The link 31 is connected by a linkage 34 to the lower end of a stud 36 having a threaded upper end and which extends through an opening 37 in the cross bar 26. A spring is disposed about the stud 36 between the upper side of the cross bar 26 and a nut 38 which threads onto the outer end of the stud 36. When the motor 28 is energized to rotate the shaft 29, the link 31 will be raised and lowered to open and close the jaw 22, the upper end of the linkage 34 engaging the cross bar to lift the latter on the up stroke of link 31. The throw of the link 31 is such that the jaw 22 preferably engages the jaw provided by the support member 18 and the heating element, just before the link reaches the low point of its movement and the spring will compress to provide lost motion between the operating linkage and the cross bar 26 and to apply pressure to the sheets being welded.

The motor shaft 29 is connected to the crank plate 30 at a point displaced from the center thereof and the plate 30 has two sides 39a, 30b which lead to a corner of the plate 30c which is displaced the farthest from the axis of the shaft 29. The corner of the plate 30c and the sides leading thereto form a cam surface, with the high point of the cam being the corner 30c, for operating a switch 40 supported adjacent the crank plate 30. The switch 40 has a switch actuator 41 which is biased toward engagement with the edge of the crank plate 30 and when the actuator is in engagement with the rounded corner 30c, the switch is open and when the crank plate is rotated to reciprocate the jaw 22, the actuator 41 will ride down the cam surface 30a and the switch 40 will close and remain closed until the actuator rides up the cam surface 30b and onto the high point 30c. In the structure illustrated, the actuator will lose contact with the crank plate before it rides off the surface 30a.

The jaw 22 comprises a channel-shaped base member 42 which is bolted to the arms 23 and which has a channel 43 in the upper side thereof and a flat bottom side generally facing the heating element 17 and to which a facing block of heat-resistant rubber 44 is bonded or otherwise secured. The block of rubber 44 has a pressure face which is covered by a removable strip 45 of "Teflon," "Teflon" being a trade name for a polytetrafluoroethylene resin. The strip 45 of "Teflon" covers the outer face of the rubber 44 and the ends of the strip are held by clips 47 in the channel 43 on the top of the base member 42.

The preferred embodiment of the present invention also has a parting sheet 50 of "Teflon" material wound in a roll disposed adjacent the support member 18 of the heating element 17. The roll of "Teflon" material is supported between the side plates 11, 12 in the space 16 and has a core 51 upon which the "Teflon" is wound. The core 51 extends outwardly of the side 11 and has a knob 52 fixed thereto for rotating the core 51 to wind and unwind the sheet of "Teflon." The sheet of "Teflon" wound on the core 51 may be pulled over the heating element 17 and the outer end of the "Teflon" has affixed thereto a strip of magnetic material 53 which is attracted to the metal front wall 13 of the casing 10. The attraction of the magnetic material causes a bow to be present in the "Teflon" material above the heating element 17 for purposes explained hereinafter.

The "Teflon" cover 45 and the "Teflon" sheet 50 are provided as parting sheets so that certain types of plastic may be used without gumming or sticking to the heating element 17 or to the rubber face 43. Polyethylene type of materials will tend to gum and stick when sealed.

The heating element 17 is continuously energized from the secondary coil 54 of a transformer 55 having a primary 56. The transformer 54 is a stepdown transformer and the heating element is connected directly across the secondary 54 by electrical conductors so that the resistance of the heating element 17 comprises a significant part of the resistance in the circuit traversed by the current flowing in the heating element 17. In practice, "Nichrome" wire is used and the resistance of the heating element 17 may be in the order of one ohm. The primary 56 of the transformer 55 is energized from an A.C. source by connections which include a variable resistor 58. The variable resistor 58 may be adjusted to control the voltage applied to the primary of the transformer 55 to thereby adjust the voltage of the secondary coil 54 and the current flowing in the heating element 17. It has been found that the described structure provides a heating element 17 whose temperature will be determined by the magnitude of current flowing therein and that the temperature of the heating element can be readily adjusted or changed by changing the voltage applied to the circuit for energizing the heating element. Once a voltage has been set, the temperature of the heating element will rapidly come to a predetermined point and this temperature will tend to be maintained constant, since increases or decreases in temperature will cause a corresponding increase or decrease in the resistance of the heating element to vary the current in the circuit to maintain the temperature substantially constant. This is true because the wirelike heating element 17 constitutes a significant part of the resistance in the circuit through which the current energizing the heating element flows.

When the wirelike heating element 17 is heated, it will tend to bow and it is important that the heating element 17 be backed along the length thereof which is used as a pressure-applying element for effecting a seal. In order to assure that the heating element 17 will lay against the support member 18 and will not bow outwardly therefrom, the right-hand end of the heating element, as the latter is viewed in FIG. 1, is clamped to a pin 60 which extends outwardly of the side wall 12 of the housing 10 through a slot 61. The pin 60 is urged outwardly of the housing by a spring 62 which is disposed between a nut 63 threaded onto the outer end of the pin 60 and the side wall 12 of the housing 10. The spring 62 will act through the pin 60 to tension the heating element 17 and to maintain it in a taut condition where it is backed by the support member 18 for substantially the entire length thereof. It is understood that the other end of the heating element is held so that the element can be tensioned.

In operation, the two sheets of material which are to be sealed or welded are pressed between the jaw 22 and the jaw defined by the heating element 17 and the support member 18 therefor. The motor 28 is energized to cause the jaw 22 to reciprocate down onto the sheets to be sealed which are disposed between the jaw 22 and the heating element 17 and to press the sheets downwardly onto the "Teflon" sheet 50 which, in turn, is pressed against the heating element 17. The heating element 17 functions as the pressure-applying member of the jaw defined by the support member 18 and the heating element 17 and when adjusted to the proper temperature, which can be quickly and readily determined by a few trial seals, will cause a weld between the sheets of plastic material. The motor 28 operates for one revolution each time it is energized and the jaw 22 is only pressed against the plastic and heating element 17 for a moment during each cycle. If it is found that the heating element is either too hot or too cold to effect the required seal, the rheostat 58 is adjusted and the temperature of the heating element 17 will quickly change to that corresponding to the current now flowing in the element.

One of the features of the present invention is that the heating element 17 is heat-insulated from all parts of the apparatus which might function as a heat sink and prevent the temperature of the heating element 17 from rapidly following the changes in the temperature called for by the changes in current. To enable the temperature applied to the seal to be controlled quickly and accurately by controlling the rheostat 58, it is desirable that the "Teflon" sheet 50 have an air space between the sheet and the heating element 17 when the jaws are in their open position and the heating element 17 energized. This air space allows a cooling of the "Teflon" and provides proper environmental conditions for the heating element 17. If the "Teflon" sheet 50 is against the heating element 17, it will tend to become overheated if the heating element is energized while the apparatus is not being used and might cause the initial seals of the next series of operations to be poor seals due to too much heat in the area of the seals. The described construction overcomes any problem along this line.

It should be noted that the "Teflon" sheet 50 is not necessary for effectiving all seals. The sheet is used with certain materials but need not be used with all materials. For example, cellophane does not tend to stick when sealed and, therefore, the parting sheet 50 need not be used when sealing cellophane.

As stated hereinbefore, the motor 28 makes one revolution each time it is energized. Referring to the circuit drawings, it will be noted that a switch 65 is provided and which, when closed, effects the energization of the motor 28. The switch 65 is paralleled by the contacts 66 of the switch 40 and when the motor starts, as a result of the operation of the switch 65, the switch 40 will close and will remain closed until the actuator 41 is operated by the high point of the cam 38c at the end of one revolution to open the switch 40. When the switch 40 is opened, the motor 28 will stop unless the switch 65 has been held closed.

It can now be seen that the above-enumerated objects and others have been accomplished and that the present invention has provided a new and improved sealing or welding apparatus for joining sheets of flexible material, particularly heat-sealable organic materials, such as thermoplastic polyethylene or cellophane, and that an apparatus has been provided for quickly effecting a weld or seam which is of an airtight nature, with the apparatus being such that it may readily and quickly be adjusted to handle various types of materials and various thicknesses of materials.

While a preferred embodiment of the present invention has been described in considerable detail, it is hereby my intention to cover all constructions, modifications and arrangements which fall within the ability of those skilled in the art and within the spirit and scope of the present invention.

Having described my invention, what I claim is:

1. A heat-sealing apparatus for forming a continuous uninterrupted seal in flexible sheets of heat sealable film comprising relatively movable presure members having an open position and a closed pressure-applying position, mechanism actuatable to operate said members through a cycle to move said members from their said open position to their closed position in which said members are pressed into engagement with heat sealable film positioned therebetween and for returning said members to their open position, one of said members comprising a wire-like current-carrying electrical heating and sealing element and a rigid support member for said heating and sealing element of heat-insulating material, tensioning means operatively connected to said wire-like heating and sealing element for maintaining said wire-like heating and sealing element taut and against one side of said rigid support member facing the other of said pressure members, said one side of said rigid support member supporting said wire-like heating and sealing element and backing said heating and sealing element for substantially the entire length thereof and said heating and sealing element projecting from said one side toward the other of said pressure members to constitute the pressure-applying element of said one pressure member, and circuit means for establishing a current flow in said wire-like heating and sealing element and maintaining said heating and sealing element continuously energized independently of the position of said pressure members, said circuit means, said tensioning means and said rigid support member comprising means effective to maintain said wire-like heating and sealing element free of substantial warpage whereby said wire-like heating and sealing element is maintained substantially straight to effect a continuous uninterrupted airtight seal.

2. An apparatus as defined in claim 1 wherein the resistance of said heating and sealing element constitutes a significant part of the resistance in the circuit traversed by the current flowing in the heating and sealing element whereby said current is varied with changes in resistance of said heating and sealing element as the temperature thereof changes to maintain the temperatures substantially constant for a given voltage applied to said circuit, and said circuit means includes means for adjusting the current flow in said wire-like heating and sealing element to adjust the temperature thereof.

3. A heat-sealing apparatus for forming a continuous uninterrupted seal in flexible sheets of heat sealable film comprising relatively movable pressure members having an open position and a closed pressure-applying position, mechanism actuatable to operate said members through a cycle to move said members from their said open position to their closed position in which said members are pressed into engagement with heat sealable film positioned therebetween and for returning said members to their open position, one of said members comprising a wire-like current-carrying electrical heating and sealing element and a rigid support member for said heating element of heat-insulating material, tensioning means operatively connected to said wire-like heating and sealing element for maintaining said wire-like heating and sealing element taut and against one side of said rigid support member facing the other of said pressure members, said tensioning means including spring means acting on the opposite ends of said wire-like heating and sealing element and biasing said wire-like heating and sealing element inwardly toward said one side of said rigid support member thereby holding said wire-like heating and sealing element in engagement with said one side of said rigid support member, said one side of said rigid support member supporting said wire-like heating and sealing element and backing said heating and sealing element for substantially the entire length thereof and said heating and sealing element projecting from said one side toward the other of said members to constitute the pressure-applying element of said one pressure member, and circuit means for establishing a current flow in said wire-like heating and sealing element and maintaining said heating and sealing element continuously energized independently of the position of said pressure members, said circuit means, said tensioning means and said rigid support member comprising means effective to maintain said wire-like heating element free of substantial warpage whereby said wire-like heating and sealing element is maintained substantially straight to effect a continuous uninterrupted airtight seal.

References Cited in the file of this patent

UNITED STATES PATENTS

| | | | |
|---|---|---|---|
| 2,293,568 | Snyder | Aug. 18, | 1942 |
| 2,514,197 | Groten et al. | July 4, | 1950 |
| 2,629,808 | Ulmschneider | Feb. 24, | 1953 |
| 2,638,964 | Andiana | May 19, | 1953 |
| 2,641,304 | Biddinger et al. | June 9, | 1953 |
| 2,646,105 | Langer | July 21, | 1953 |
| 2,682,294 | Langer | June 29, | 1954 |
| 2,708,648 | Ulmschneider | May 17, | 1955 |
| 2,804,086 | Fener | Aug. 6, | 1957 |
| 2,866,062 | Fisher | Dec. 23, | 1958 |
| 2,868,942 | Lyijynen | Jan. 13, | 1959 |
| 2,904,100 | Fener | Sept. 15, | 1959 |
| 2,958,368 | Dreeben | Nov. 1, | 1960 |
| 3,005,402 | Starger et al. | Oct. 24, | 1961 |

FOREIGN PATENTS

| | | | |
|---|---|---|---|
| 778,777 | Great Britain | July 10, | 1957 |